(12) United States Patent
Mancosu et al.

(10) Patent No.: US 7,552,628 B2
(45) Date of Patent: Jun. 30, 2009

(54) METHOD AND SYSTEM FOR DETERMINING A CORNERING ANGLE OF A TYRE DURING THE RUNNING OF A VEHICLE

(75) Inventors: Federico Mancosu, Milan (IT);
Massimo Brusarosco, Milan (IT);
Daniele Arosio, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 325 days.

(21) Appl. No.: 10/576,541

(22) PCT Filed: Oct. 24, 2003

(86) PCT No.: PCT/EP03/50755

§ 371 (c)(1),
(2), (4) Date: Feb. 7, 2007

(87) PCT Pub. No.: WO2005/043106

PCT Pub. Date: May 12, 2005

(65) Prior Publication Data

US 2007/0171034 A1 Jul. 26, 2007

(51) Int. Cl.
*G01M 17/02* (2006.01)
(52) U.S. Cl. .......................... 73/146; 701/36
(58) Field of Classification Search ............... 73/146; 701/1, 36
See application file for complete search history.

(56) References Cited

U.S. PATENT DOCUMENTS

| | | | |
|---|---|---|---|
| 4,724,703 A | 2/1988 | Neugebauer et al. | |
| 5,247,831 A | 9/1993 | Fioravanti | |
| 5,458,176 A * | 10/1995 | Rhyne | 152/556 |
| 5,616,859 A * | 4/1997 | Rhyne | 73/146 |
| 5,793,285 A | 8/1998 | Wehinger | |
| 6,047,229 A | 4/2000 | Ishikawa | |
| 6,538,566 B1 | 3/2003 | Morand et al. | |
| 6,539,295 B1 | 3/2003 | Katzen et al. | |
| 6,614,343 B1 | 9/2003 | Fennel et al. | |
| 6,729,179 B2 * | 5/2004 | Crema et al. | 73/146 |
| 7,013,721 B2 | 3/2006 | Keller et al. | |
| 2003/0050743 A1 | 3/2003 | Caretta et al. | |
| 2003/0058118 A1 | 3/2003 | Wilson | |
| 2003/0167832 A1 | 9/2003 | Novak et al. | |
| 2005/0159874 A1 * | 7/2005 | Bertrand | 701/80 |
| 2007/0240501 A1 * | 10/2007 | Mancosu et al. | 73/146 |
| 2008/0103659 A1 * | 5/2008 | Mancosu et al. | 701/41 |

FOREIGN PATENT DOCUMENTS

| | | |
|---|---|---|
| CN | 1206687 A | 2/1999 |
| EP | 0 233 357 A1 | 8/1987 |
| EP | 0 885 756 A1 | 12/1998 |
| EP | 0 887 211 A1 | 12/1998 |
| WO | WO 03/016115 A1 | 2/2003 |

* cited by examiner

*Primary Examiner*—Andre J Allen
(74) *Attorney, Agent, or Firm*—Finnegan, Henderson, Farabow, Garrett & Dunner, L.L.P.

(57) ABSTRACT

A method and a system for determining a cornering angle of a tyre fitted on a vehicle during running of the vehicle on a rolling surface. The tyre has an equatorial plane. In the method, the length of the contact region between the tyre and the rolling surface is estimated, the length being measured at a distance from the equatorial plane; the load exerted on the tyre is estimated; a camber angle to which the tyre is subjected, is estimated; and the cornering angle is derived from the camber angle, tyre load and contact region length.

42 Claims, 8 Drawing Sheets

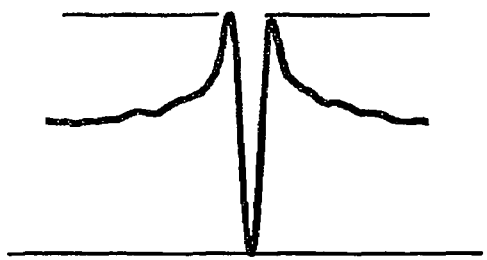
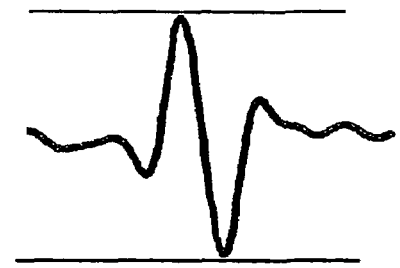
Fig. 4
Fig. 5
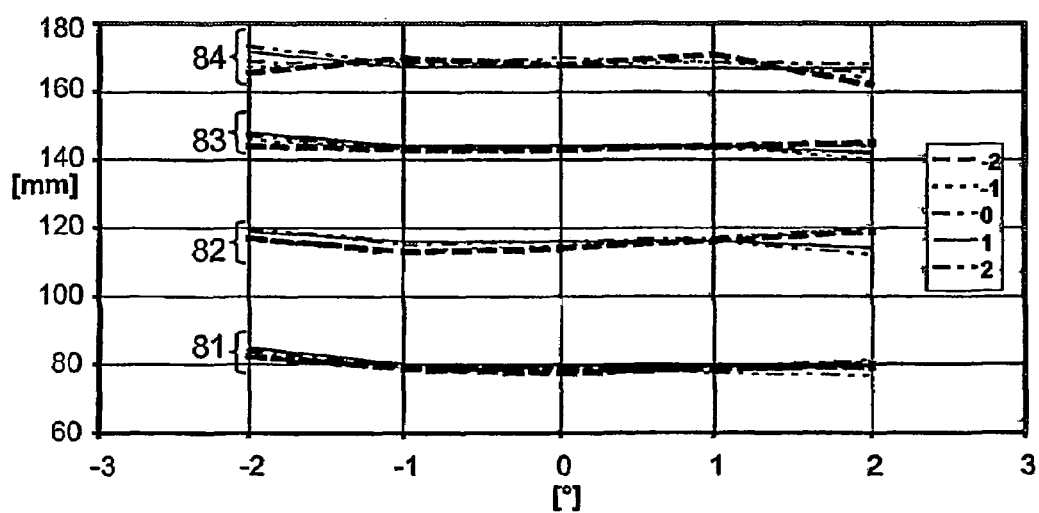
Fig. 8

METHOD AND SYSTEM FOR DETERMINING A CORNERING ANGLE OF A TYRE DURING THE RUNNING OF A VEHICLE

CROSS REFERENCE TO RELATED APPLICATION

This application is a national phase application based on PCT/EP2003/050755, filed Oct. 24, 2003, the content of which is incorporated herein by reference.

BACKGROUND OF THE INVENTION

1. Field of the Invention

The present invention relates to a method and a system for determining a cornering angle of a tyre mounted on a vehicle, during running of such a vehicle.

2. Description of the Related Art

Information related to tyre conditions should be provided to a vehicle control system in order to control a vehicle. For example, such information may include the one relating to the load exerted on the tyres or to the length of the contact region between the tyre and the ground. For instance, U.S. Pat. No. 5,793,285 discloses a method and apparatus for monitoring tyres on a vehicle, by continuously measuring the distance between the associated vehicle axle (or a vehicle body part rigidity connected thereto) and the road, while the vehicle is in operation. From this measurement, the tyre deflection is determined. According to the authors, the measured tyre deflection represents a comparatively exact measure of the respective tyre load. When the tyre deflection determined leaves a predetermined desired range, a warning signal is transmitted.

PCT patent application no. WO 03/016115 discloses a method for determining the charge or load exerted on a tyre of a motor vehicle and/or for monitoring tyre pressure, wherein the pressure in each tyre is detected during operation of the vehicle and the rotational behavior of the individual wheels is observed. Load distribution parameters are also determined by comparing the rotational behavior and/or changes in said rotational behavior of the individual wheels during given driving states, taking into account preset and/or predetermined and/or learned variables. Tyre pressure and load distribution parameters are used to determine the load or charge exerted on the tyres and/or pressure loss. Furthermore, US patent application no. 2003/0058118 discloses a vehicle and vehicle tyre monitoring system, apparatus and method for determining the load-induced deflection or deformation of a vehicle tyre. Based thereon, deflection-related information, such as tyre load, molar air content total vehicle mass and distribution of vehicle mass, are provided.

U.S. Pat. No. 6,538,566 describes a process for the in-service monitoring of the condition of a tire of a wheel riding on a ground, the tire having a tread, the process comprising the steps of: providing in the tire, near the tread, a miniature sensor for sensing radial acceleration; monitoring the variations in the measurement from the sensor; detecting a decrease in the radial acceleration, said decrease corresponding to a zone of the tread in contact with the ground; and measuring a period of low radial acceleration phases and a fraction of this period during which the radial acceleration is low, said fraction within each period being related to a length of said zone where the tread is in contact with the ground, and thereby to the condition of the tire.

EP-0 887 211 relates to pneumatic tires for vehicles and in particular to a system for monitoring Ores by monitoring their deflection. The system comprises: a sensor device operatively arranged with respect to the tire to create an electrical pulse during the footprint pass corresponding to a deformation of the tire; means for calculating a ratio of the duration of said electrical pulse to the duration of one tire revolution; means for transmitting said ratio to an evaluating unit placed in the vehicle; wherein said sensor device is placed within the tread area of said tire in order that said electrical pulse presents a first maximum at the entrance and a second maximum at the leaving of said footprint pass.

SUMMARY OF THE INVENTION

According to the Applicant, it would be profitable to measure the cornering angle of a tyre fitted on a vehicle during the running of such a vehicle on a rolling surface. The cornering angle is a basic parameter for controlling a vehicle and avoiding any instabilities thereof, such as, for example, yaw instabilities. It has to be noticed that a certain steering angle that is set in a vehicle could result in a different cornering angle of a tyre. This because of several reasons, including the fact that a tyre is made of deforming rubber. Thus, the cornering angle to which the tyres are subjected during a steering maneuver cannot be easily deducted from a measurement performed on the vehicle.

The Applicant has faced the problem of determining in real-time, i.e. during the running of the vehicle, and in a reliable way, the cornering angle to which a tyre fitted on the vehicle is subjected.

According to a first aspect thereof, the present invention provides a method for determining a cornering angle of a tyre fitted on a vehicle during a running of said vehicle on a rolling surface, the tyre comprising an equatorial plane, the method comprising the steps of estimating a length of a contact region between said tyre and said rolling surface, said length being measured at a distance from the equatorial plane; estimating a load exerted on said tyre; estimating a camber angle to which said tyre is subjected; deriving such cornering angle from said camber angle, tyre load and contact region length.

Preferably, the step of measuring a length of a contact region comprises the step of acquiring a first acceleration signal.

Preferably, the method comprises a step of low-pass filtering said first signal.

Preferably, the step of acquiring a first signal comprises acquiring a tangential acceleration signal.

Alternatively, the step of acquiring a first signal comprises measuring a distance between a maximum value and a minimum value of said first signal.

Preferably, the of acquiring a first signal comprises acquiring a radial acceleration signal.

Profitably, the step of acquiring a first signal comprises measuring a distance between two maxima of said first signal.

Preferably, the step of deriving the cornering angle from the camber angle, the tyre load and the contact region length comprises the step of providing characteristic curves of the contact region versus the cornering angle for at least one tyre load.

Preferably, the method comprises the further step of providing a fit equation approximating the characteristic curves of the contact region versus the cornering angle.

Preferably, the step of providing a fit equation approximating the characteristic curves of the contact region versus the cornering angle comprises the step of providing the equation of a straight line in a plane, characterized by the further step of associating values of slope and intercept for predetermined conditions of tyre load and camber angle for said tyre.

According to a second aspect thereof, the present invention provides a system for determining a cornering angle of a tyre fitted on a vehicle during a running of said vehicle on a rolling surface, the tyre comprising an equatorial plane, the system comprising: a device for measuring a length of a contact region between said tyre and said rolling surface, said length being measured at a distance from the equatorial plane; a device for estimating a tyre load exerted on said tyre; a device for estimating a camber angle to which said tyre is subjected; and at least one processing unit being adapted to derive the cornering angle from said camber angle, tyre load and contact region length.

Preferably, the measuring device comprises at least one radial accelerometer producing at least one radial acceleration signal.

Preferably, the measuring device comprises at least one tangential accelerometer producing at least one tangential acceleration signal.

Preferably, the device for estimating a tyre load exerted on said tyre comprises at least one radial accelerometer producing at least one radial acceleration signal.

Alternatively, the device for estimating a tyre load exerted on the tyre comprises at least one tangential accelerometer producing at least one tangential acceleration signal.

Preferably, the measuring device and the device for estimating a tyre load exerted on said tyre comprises a sampling device adapted to sample said signal at a frequency of at least 5 kHz.

Profitably, the sampling device is adapted to sample said signal at a frequency of at least 7 kHz.

Advantageously, the system further comprises at least one memory associated to said processing unit.

Preferably, the at least one memory comprises pre-stored characteristic functions describing an expected contact region length versus cornering angle, corresponding to predetermined conditions of tyre load and camber.

Preferably, the measuring device is included in a sensor device located in a tread area portion of said tyre.

Preferably, the sensor device is disposed at a distance from the equatorial plane of the tyre comprised between 15% and 30% of the tread width, more preferably between 18% and 28% of the tread width, even more preferably between 20% and 25%.

Preferably, the sensor device is secured to an inner liner of the tyre.

Preferably, the system comprises a damping element between said sensor and said inner liner.

Preferably, the sensor device further includes a transmitting device.

Preferably, the transmitting device is operatively connected to a first antenna.

Preferably, the system further comprises a filtering device adapted for low-pass filtering said acceleration signal.

Preferably, the sensor further comprises a power source.

Preferably, the power source comprises a battery.

Preferably, the power source comprises a self-powering device, being adapted to generate electrical power as a result of mechanical stresses undergone by said sensor device during running of said vehicle.

Preferably, the self-powering device comprises a piezoelectric element.

Preferably, the self-powering device comprises an electrical storage circuit.

Preferably, the electrical storage circuit comprises a resistor and a capacitor.

Preferably, the processing unit is included within said sensor device.

Preferably, the system further comprises a fixed unit located on the vehicle, comprising a receiving device for receiving data from said sensor device.

Preferably, the receiving device comprises a second antenna.

Preferably, the first antenna and the second antenna are adapted for data transmission at a frequency comprised between 400 and 450 MHz.

According to a third aspect thereof, the present invention provides a method of controlling a vehicle having at least one tyre fitted thereon, comprising: determining a cornering angle of said tyre; passing said determined cornering angle to a vehicle control system of the vehicle; and adjusting at least one parameter in said vehicle control system based on said determined cornering angle.

Preferably, said vehicle control system comprises a brake control system, and the step of adjusting at least one parameter comprises adjusting a braking force on said tyre.

Alternatively, the vehicle control system comprises a steering control system, and the step of adjusting at least one parameter comprises selecting a maximum variation allowed from steering commands.

Still alternatively, the vehicle control system comprises a suspension control system, and the step of adjusting at least one parameter comprises adjusting a stiffness of a suspension spring associated to said tyre.

BRIEF DESCRIPTION OF THE DRAWINGS

Further features and advantages of the present invention will be better illustrated by the following detailed description of an example thereof, herein given with reference to the enclosed drawings, in which:

FIG. 4 shows an exemplifying radial acceleration curve obtained after filtering a radial acceleration signal;

FIG. 5 shows an exemplifying tangential acceleration curve obtained after filtering a tangential acceleration signal;

FIG. 8 shows a plot carrying curves of patch lengths measured by a central accelerometer versus cornering angles;

DETAILED DESCRIPTION OF THE INVENTION

Figure 1:
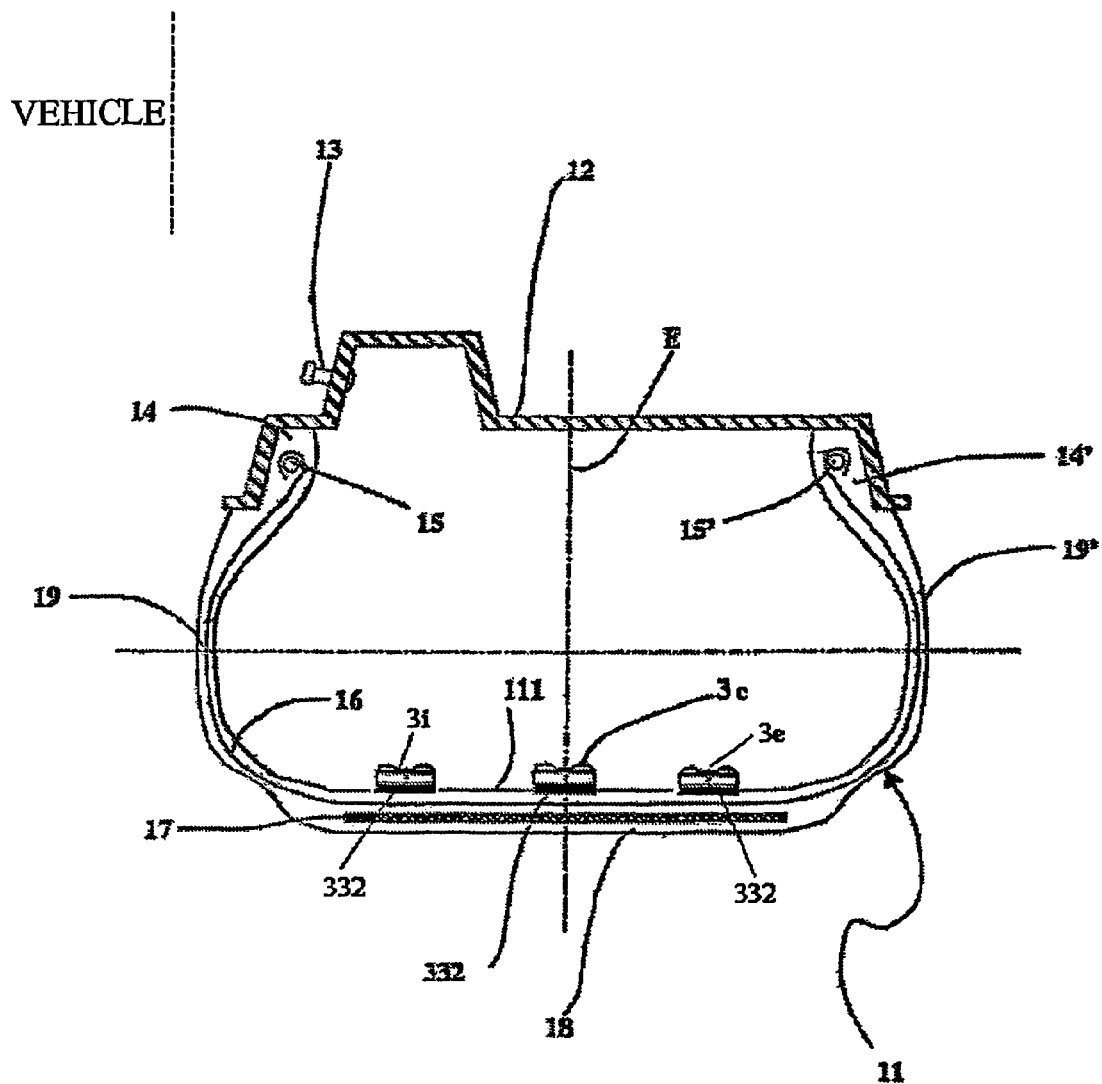
FIG. 1 shows a cross section of a tyre including a triad of sensor devices, according to a preferred embodiment of the invention.

FIG. 1 shows a cross section of a wheel comprising a tyre 11 and a supporting rim 12. The tyre 11 shown in FIG. 1 is of a type conventionally known as "tubeless", i.e. it does not include an inner tube. This tyre can be inflated by means of an inflation valve 13 positioned, for example, on the channel of the said rim 12. The tyre is fitted on a vehicle (not shown).

The tyre 11 includes a carcass 16, terminating in two beads 14 and 14', each formed along an inner circumferential edge of the carcass 16, for fixing the tyre 11 to the corresponding supporting rim 12. The beads 14, 14' comprise respective reinforcing annular cores 15 and 15', known as bead cores. The carcass 16 is formed by at least one reinforcing ply, including textile or metallic cords, extending axially from one bead 14 to the other 14' in a toroidal profile, and having its ends associated with a respective bead core 15 and 15'. In tyres of the type known as radial, the aforesaid cords lie essentially in planes containing the axis of rotation of the tyre. An annular structure 17, known as belt structure, is placed in a radially external position with respect to the carcass 16. Typically, the belt structure 17 includes one or more strips of elastomeric material incorporating metal and/or textile cords, overlapping with each other. A tread band 18 of elastomeric material is wound around the belt structure 17 and impressed with a relief pattern for the rolling contact of the tyre with the ground. Two sidewalls 19 and 19' of elastomeric material, each extending radially outwards from the outer edge of the corresponding bead 14 and 14', are also placed on the carcass 16 in axially opposed lateral positions. In tubeless tyres the inner surface of the carcass 16 is normally covered with a liner 111, i.e. with one or more layers of air-impermeable elastomeric material. Other known elements, such as for example bead fillers may be provided, according to the specific design of the tyre 11.

At least one sensor device 3i, 3e, that will be described in detail in the remainder of the description, is associated with the tyre 11. The at least one sensor device 3i, 3e is used for calculating the tyre contact patch, namely the length of a contact region between the tyre and the rolling surface, at a distance from the equatorial plane of the tyre. The at least one sensor device 3i, 3e may be profitably located in a portion of the tread area of the tyre 11, i.e. the region of the tyre 11 axially extended between the sidewalls of the tyre 11. More particularly, such sensor is disposed in a shoulder region of the tread area of the tyre, i.e. at a certain distance from the equatorial plane E of the tyre. Preferably, such sensor is disposed in the farther shoulder region with respect to the vehicle (external sensor device), since measurements performed by an external sensor device during cornering vary more remarkably than measurements provided by an internal sensor device. However, in a preferred embodiment, two sensor devices 3i, 3e may be disposed substantially symmetrically with respect to the equatorial plane of the tyre 11. This embodiment is profitable in particular for cross-checking the measurements. Preferably, the two sensor devices are placed substantially along the same meridian plane of the tyre. In a still further embodiment, a third sensor device 3c is placed on the tyre, preferably substantially along the same meridian plane and substantially along the equatorial plane. For the purposes of the present invention, the sensor device 3i that is closer to the vehicle is defined as the "internal sensor device" whilst the sensor device 3e that is at the outermost portion of the tyre is defined as "external sensor device". For the purposes of the present invention, the expression "substantially along the same meridian plane" contemplates a certain amount of misalignment of the sensors with respect to said meridian plane, that can be expressed in terms of the angle comprised between the meridian planes defined by the sensor positions. Preferably, the tolerated misalignment may correspond to an angle not greater than 5°, more preferably not greater than 3°, even more preferably not greater than 1°. Preferably, the external and/or internal sensor devices should be disposed at a distance from the equatorial plane of the tyre comprised between 15% and 30% of the tread width, more preferably between 18% and 28% of the tread width, even more preferably between 20% and 25% of the tread width. For example, in a tyre having a tread width of 195 mm, two sensor devices 3i, 3e may be disposed on opposite sides with respect to the equatorial plane, each at a distance of 45 mm thereof.

The sensor devices 3c, 3i, 3e are preferably secured to the inner liner 111 of the tyre 11. A fixing element 332 adheres both to each sensor device and to the inner liner 11. Suitable materials for the fixing element 332 may include generally flexible rubbers, such as for example natural rubber, or synthetic rubber, e.g. rubbers made from conjugated dienes having from 4 to 10 carbon atoms such as poly-isoprene, polybutadiene, styrene-butadiene rubber and the like. In preferred embodiments, a material included in the fixing element 332 should have a damping effect, in order to secure the fixing of the sensor devices to the inner surface of the tyre by minimizing the mechanical stresses exerted onto the fixing surface during use of the tyre 11. Furthermore, a damping material reduces the probability of damages to the sensor devices by preventing transmission of the above stresses to the device. Suitable damping materials may have a Shore A hardness (measured at 23° C. according to ASTM Standard D2240) of from about 1 to about 40, and an elastic rebound (measured at 23° C. according to ASTM Standard D1054) lower than about 60. Cross-linked diene elastomers or polyurethane gel materials may be adapted in order to fit with these damping specifications. For improved adhesion between the sensor devices and the liner 111, it may be advantageous to interpose a further adhesive element, for example a double-sided adhesive film, between the fixing element 332 and the inner surface of the liner 111 and/or between the fixing element 332 and the sensor devices 3e, 3i, 3c. An appropriate double-sided adhesive film may be the Scotch® 300SL HI Strength, marketed by 3M. In alternative embodiments, the sensor devices 3c, 3i, 3e may be incorporated within the structure of the tyre in the tread area, for example within the tread band, or between the outer belt strip and the tread band.

In a preferred embodiment of the present invention (not shown), several groups of sensor devices may be disposed within the tyre 11, in circumferential positions spaced one from each other, preferably of substantially the same angle. For example, three groups of sensor devices may be located within the tyre, circumferentially spaced from each other of an angle of substantially 120°. Each group of sensor devices may comprise one or more sensor devices. With regards to the number, the disposition and the securing to the tyre of the sensor devices in each group, reference is made to what said above. More particularly, corresponding sensor devices belonging to different groups may be located substantially along a same plane parallel to the equatorial plane of the tyre.

The use of several groups of sensor devices disposed in circumferentially spaced positions within the tyre allows to achieve more accuracy and reliability of the measurements performed, as well as a better monitoring of the tyre during the entire wheel turn.

The sensor devices 3c, 3i, 3e are adapted to communicate with a unit external to the tyre 11. Such external unit will be referred in the following as "fixed unit". The fixed unit may be located on the vehicle on which the tyre 11 is fitted.

Figure 2:
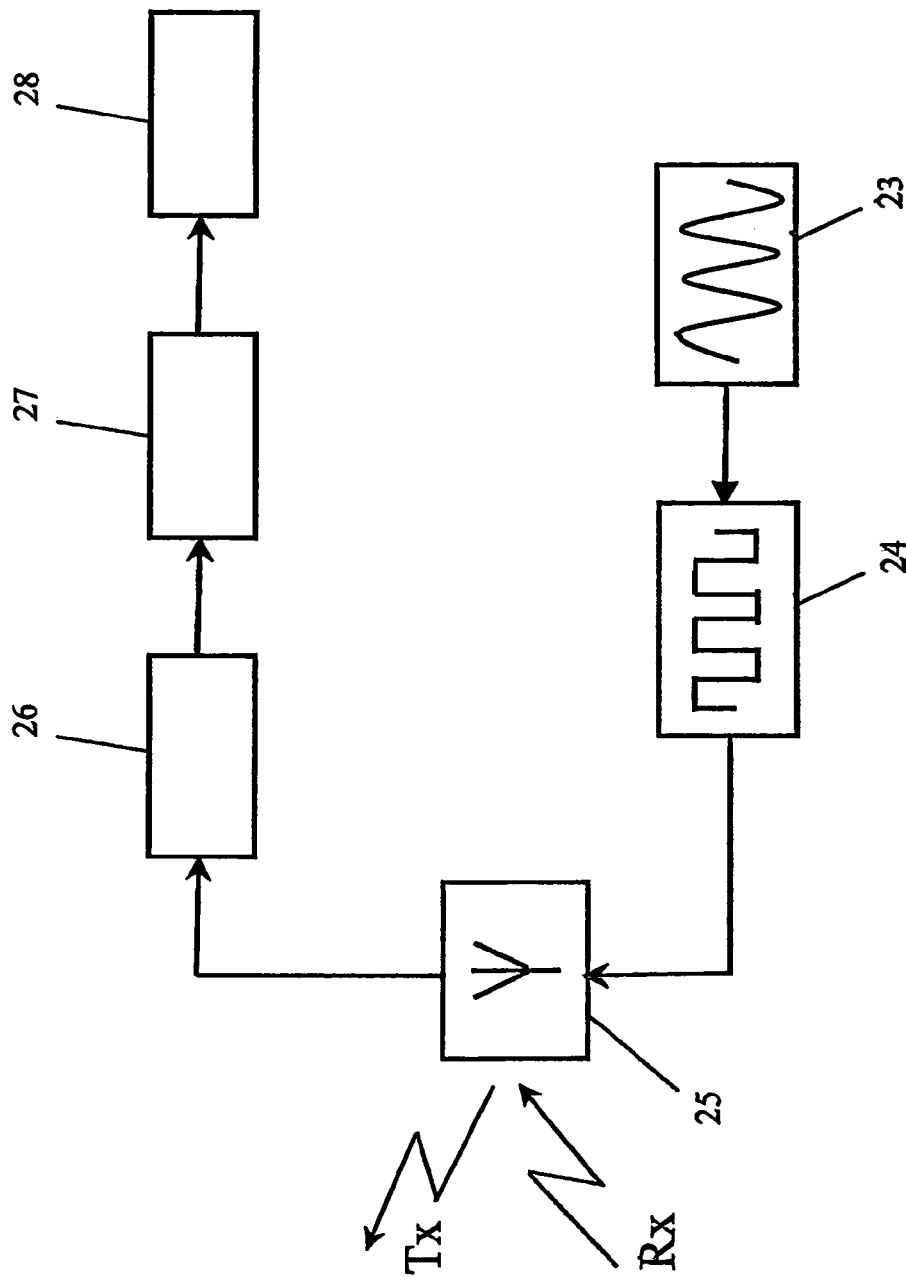
FIG. 2 shows a diagram of an embodiment of fixed unit included in a system according to the invention.

For example, FIG. 2 shows a block diagram of a fixed unit 2, comprising a device for receiving from the sensor device 3c, 3i, 3e included within the tyre 11. Preferably, the fixed unit 2 also comprises a device for transmitting to said sensor device 3c, 3i, 3e. The receiving device may comprise a radio-frequency receiver 26 connected to a first antenna 25, referred to below as the "fixed antenna". Preferably, the receiving device also comprises an electrical demodulator device 27. A memory 28, such as for example an EPROM, can store the data received by the sensor device 3c, 3i, 3e and demodulated by the demodulator 27. In preferred embodiments, the memory 28 is associated to a central processing unit (CPU, not shown in FIG. 2), in order to perform calculations from the data received by the sensor device 3c, 3i, 3e and/or stored in the memory 28. The memory 28 may also store historical logs, for example of measures of vehicle instability, or of steps the control system has taken to control the vehicle, or of alarms displayed to the vehicle driver, or of excessive loads. The transmission device preferably comprises an oscillator circuit 23, which supplies a driver circuit 24 for the fixed antenna 25. If the fixed unit 2 is located on the vehicle, the electrical energy required to power the fixed unit 2 can be supplied directly by the vehicle battery.

Figure 3:
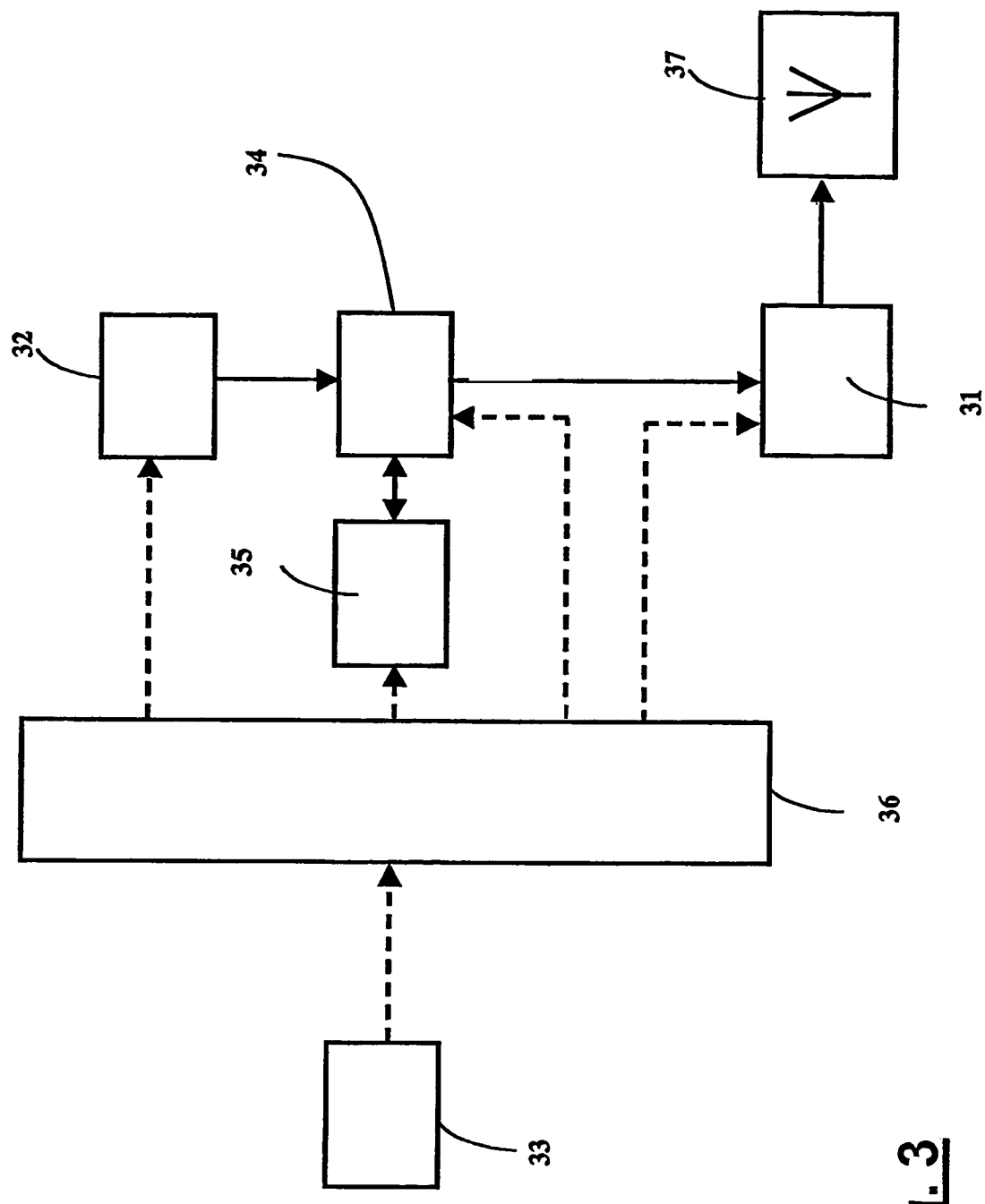
FIG. 3 shows a diagram of an embodiment of sensor device included in a tyre according to the invention.

Each sensor device 3c, 3e or 3i, an exemplary block diagram of which is shown in FIG. 3, comprises in general terms a device 31 for data transmission to the said fixed unit and a measuring device 32 adapted to measure a length of the contact region between the tyre 11 and the road (more generally, a rolling surface). The measuring device 32 may preferably comprise a radial and/or tangential accelerometer. Such accelerometer should be capable of support and correctly measure very high acceleration values, as both the radial and tangential accelerations (in particular the radial acceleration) supported by the tread area of the tyre may reach, at high speed, values of 500-1000 g, wherein g is the gravity acceleration. In an alternative embodiment, the measuring device 32 may comprise an extensometer, whose output signal gives a measure of the flexion of the monitored tread area portion. For the purposes of measuring the contact patch length, the measuring device 32 acquires a signal representative of the deformation to which the tread area portion corresponding to the position of the sensor device 3c, 3e, 3i is subjected. In order to perform a real-time determination of the tyre cornering angle, the signal should be acquired with high precision, preferably at any turn of the tyre. For this purpose, and taking into account the frequency rotation of a rolling tyre (particularly at high speed), the measuring device 32 preferably includes a sampling device (not shown) capable of enabling the reading of the deformation signal at a frequency of at least 5 kHz, more preferably at a frequency of at least 7 kHz, so as to furnish a sampled signal thereof. In preferred embodiments, the measuring device 32 may also include a pressure sensor and/or a temperature sensor. However, pressure or temperature measurements do not need a high frequency sampling. In alternative embodiments a pressure and/or a temperature sensor may be disposed externally of the sensor device 3e, 3i or 3c, e.g. within the tyre valve. Each sensor device 3c, 3i, 3e typically includes also an antenna 37, referred to below as the "mobile antenna", operatively connected to said transmission device 31, for data transmission to the fixed antenna of the fixed unit. Transmission from the mobile antenna to the fixed antenna, and/or vice versa, may occur at conventional telemetry radio-frequencies, e.g. in a band comprised between 400 and 450 MHz (for example at 418 MHz or 433 MHz).

Each sensor device 3c, 3i, 3e may further include a processing unit (CPU) 34, associated to a memory device 35. This memory device 35 may contain re-writable memory locations in which information about the measurements taken by the measuring device 32 can be stored. Furthermore, it may also contain pre-stored instructions for the processing unit 34, suitable for pre-processing the signals coming from the measuring unit 32 before transmission, in order to reduce the amount of information sent out of the tyre 11. More particularly, the deformation signal may be pre-processed in order to detect characteristic points, such as for example maxima and minima, the coordinates of which can be sent to the transmission device 31 for transmission to the fixed unit. This results in saving transmission bandwidth and required power for transmission. Furthermore, a filtering device (not shown) may be interposed between the measuring unit 32 and the processing unit 34, in order to low-pass filter the deformation signal and discriminate the useful signal: from high-frequency noise caused by the interaction between the tread band and the road. However, such filtering may be provided by electronics included within the measuring device 32 or as further pre-processing instruction stored within the memory 35.

A power source 33 allows to energize the sensor devices 3c, 3i, 3e. The power source 33 may include a battery. However, for a real-time determination of the tyre cornering angle, a great electrical power consumption may be requested by the measuring device 32 (in particular by a high frequency sampling device), by the processing unit 34 and by the transmission device 31, so that a battery could have short lifetime, as compared to the entire life of the tyre. Thus, in preferred embodiments, the power source 33 includes a self-powering device, which generates electricity as a result of the mechanical stresses to which said self-powering device is subjected (for example, centrifugal force, or the deformations of the liner, or movements due to travelling on uneven roads). As an example, piezoelectric materials may be used in the self-powering device for such purpose. The self-powering device also includes an electrical energy storage circuit (not shown), typically including a resistor and a capacitor. As a further alternative, the sensor devices 3c, 3i, 3e may be energized by the fixed unit by means of a suitable receiving device (not shown), connected to the mobile antenna 31.

A device for distributing the electrical power 36 preferably distributes appropriately the electrical power provided by the power source 33 to said processing unit 34, to said memory device 35, to said device for transmitting 31 and to said measuring device 32, according to their requirements.

It has to be noticed that it is not necessary to include the measuring device, the transmission portion to the fixed unit and the control electronics within a single packaged sensor device. For example, the control electronics and the transmission portion to the fixed unit could be packaged in a separated device secured to other parts of the tyre or of the wheel (e.g. the rim, or the sidewall), associated by a wired or wireless (e.g. optical or by radio-frequency) connection to a measuring device located in the tread area portion of the tyre.

FIG. 4 shows, by way of example, a portion of a typical radial acceleration curve obtained by a sensor device including a radial accelerometer, secured to the inner liner of a tyre, after a sampling and a filtering of the corresponding acceleration signal. It should be noticed that, at the passage under the contact region, the level of radial centrifugal acceleration sensed by the accelerometer increases abruptly a first time, then drops to until substantially zero, and then increases abruptly a second time. In other positions the radial acceleration sensed by the accelerometer has an average level related to the rotation speed of the rolling tyre: the higher the speed, the higher the sensed acceleration.

The curve of FIG. 4 shows that when the tread area portion corresponding to the position of a sensing device begins and ends its passage under the contact region, such tread area portion is subjected to a strong radial deformation (corresponding to the peaks shown in the curve), whereas in other positions such tread area portion is not practically subjected to deformations (corresponding to a substantially constant acceleration value outside from the contact region). The distance between the two maxima of the radial acceleration signal is indicative of the contact patch length PL. Different values of contact lengths could be given by measurements performed on signals acquired by internal and external sensor devices, $PL_i$ and $PL_e$, respectively.

As an alternative to or in combination with a measurement performed in radial direction, a measurement in a tangential direction may also be performed. FIG. 5 shows, by way of example, a portion of a typical tangential acceleration curve, obtained by a sensor device including a tangential accelerometer, secured to the inner liner of the tyre, after a sampling and a filtering of the corresponding acceleration signal. It should be noticed that, at the passage under the contact region, the level of tangential acceleration sensed by the accelerometer increases abruptly a first time, then drops to a negative value, and then increases abruptly a second time. In other positions the tangential acceleration sensed by the accelerometer has an average level of substantially zero, if the tyre is rolling at a constant speed. The curve of FIG. 5 shows that when the tread area portion corresponding to the position of the accelerometer begins and ends its passage under the contact patch, such tread area portion is subjected to a strong tangential deformation (corresponding to the maximum and minimum shown in the curve), whereas in other positions such tread area portion is not practically subjected to deformations (corresponding to the substantially zero tangential acceleration value outside from the contact patch).

The distance between the maxima of the radial acceleration signal or between the maximum and the minimum values of the tangential acceleration signal is thus indicative of the contact patch length PL.

More particularly, PL can be advantageously calculated by radial or tangential acceleration signals by the following formula:

$$PL = w_i \cdot r_r \cdot np_i \cdot 1/f_s$$

Wherein:

$f_s$: sampling frequency of the acceleration signal;

$r_r$: free rolling radius of the tyre;

$np_i$: number of measured points between the two maxima of the radial or between the maximum and the minimum of the tangential acceleration signal; and $w_i$: instantaneous rotation speed of the tyre.

The instantaneous angular speed of the tyre can be calculated from a radial acceleration signal, by $\sqrt{(a_i/r_r)}$ wherein $a_i$ is the average radial acceleration calculated before or after entering the contact area with the rolling surface (i.e., using a portion of the radial acceleration signal outside from the peaks shown in FIG. 4).

In a preferred embodiment, using a plurality of sensor devices located within the tyre at different circumferential positions, a first sensor device located outside the contact patch could be used in order to measure the average radial acceleration level a (and thus derive the instantaneous rotation speed of the tyre), in real-time, in the same time interval in which a second sensor device passes under the contact patch. Simple control electronics can be implemented within the sensor devices in order to trigger the needed measurements. The needed algorithms for the above described analysis of the signal generated by the accelerometer can be stored within the memory of the sensor device, in order to be used by the associated processing unit.

It has to be noticed that other methods or formulas could be used for the purpose of estimating the contact patch length. Different values of contact lengths could be given by measurements performed on signals acquired by internal and external sensor devices, $PL_i$ and $PL_e$, respectively.

Figure 6:
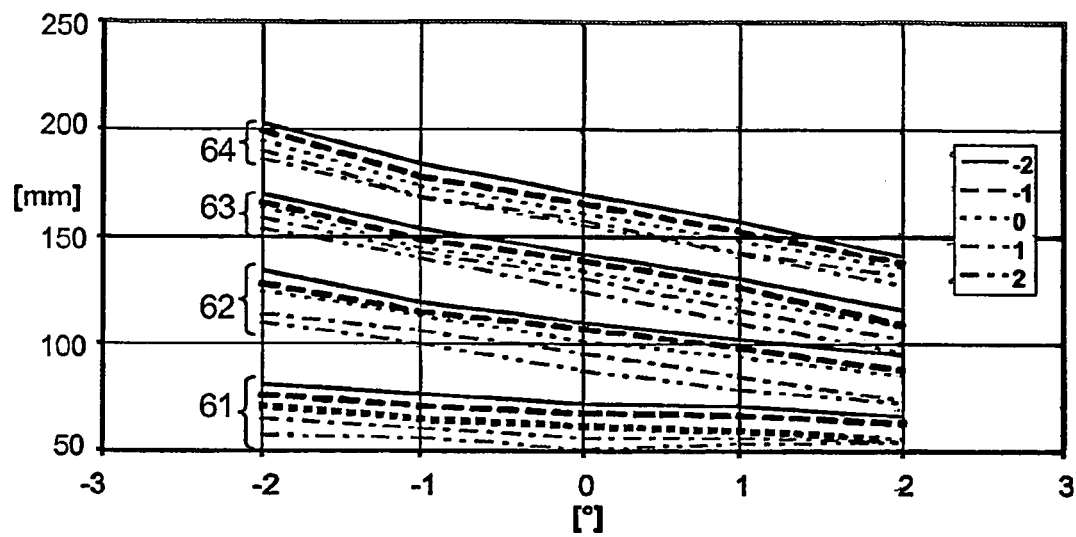
FIG. 6 shows a plot carrying curves of contact patch lengths measured by an internal accelerometer versus cornering angles.

In order to explain the principles of the invention, the results of a number of tests performed by the Applicant using a tyre "Pirelli® P6® 195/65R15" will be described in the following. In a first series of tests, the Applicant has plotted different curves of $PL_i$, namely the contact patch length measured by an internal tangential accelerometer 3i, versus cornering angle, corresponding to different tyre loads, on the same graph, at nominal inflation pressure. For each tyre load, a number of camber angles (−2°, −1°, 0°, +1°, +2°) has been set. FIG. 6 shows such a plot, carrying curves of patch length $PL_i$ measured by the internal accelerometer (ordinate) versus cornering angle (abscissa) for different tyre loads at a constant speed of 40 Km/h, with the following tyre load values: curves 61 correspond to a tyre load of 2000 N; curves 62 to a tyre load of 3500 N; curves 63 to a tyre load of 5000 N and curves 64 to a tyre load of 6500 N. For each tyre load, curves corresponding to different camber angles (+2°, +1°, 0°, −1° and −2°) have been indicated by different lines. As it can be seen, the curves depend on the camber angle and on tyre load. In particular, all the curves can be substantially considered as straight lines.

More particularly, by analyzing the curves the Applicant has observed that a) the slope of the straight lines depends on the tyre load but is substantially independent on the camber angle; and b) the intercept depends both on the camber angle and on the tyre load.

Figure 7:
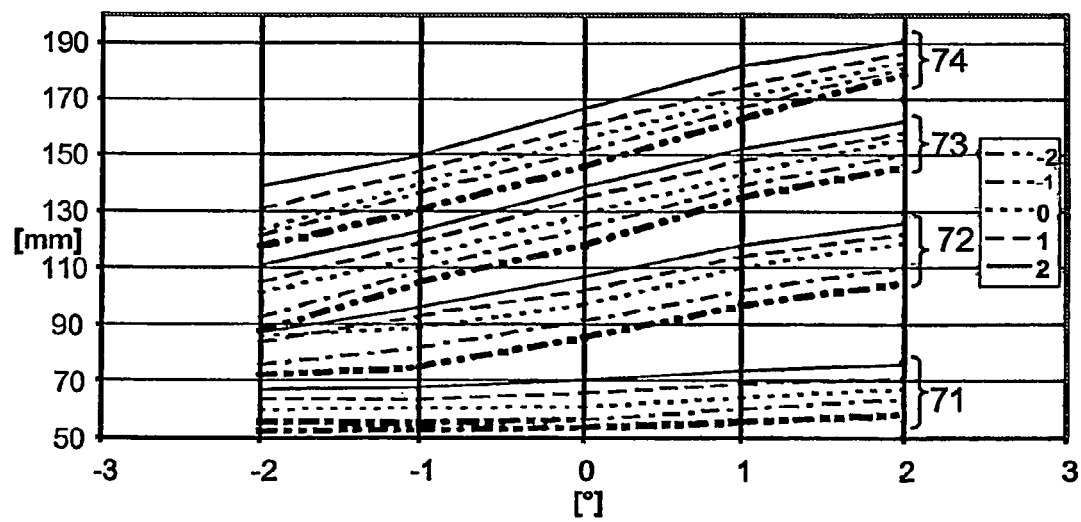
FIG. 7 shows a plot carrying curves of patch lengths measured by an external accelerometer versus cornering angles.

In a second series of tests, the Applicant has plotted different curves of $PL_e$, namely the contact patch length measured by an external tangential accelerometer 3e, versus cornering angle, corresponding to different tyre loads, on the same graph, at nominal inflation pressure. For each tyre load, a number of camber angles (−2°, −1°, 0°, +1°, +2°) has been set. FIG. 7 shows such a plot, carrying curves of patch length $PL_e$ measured by the external accelerometer (ordinate) versus cornering angle (abscissa) for different tyre loads at a constant speed of 40 Km/h, with the same tyre load values as above. Curves 71 correspond to a tyre load of 2000 N; curves 72 to a tyre load of 3500 N; curves 73 to a tyre load of 5000 N and curves 74 to a tyre load of 6500 N. For each tyre load, curves corresponding to different camber angles (+2°, +1°, 0°, −1° and −2°) have been indicated by different lines. As it can be seen by FIG. 7, a result similar to that shown in FIG. 6 is obtained, so that the same considerations made above (see points a) and b)) also apply in this case.

In a third series of tests, the Applicant has plotted different curves of $PL_c$, namely the contact patch length measured by a central accelerometer 3c, versus cornering angle, corresponding to different tyre loads, on the same graph, at constant inflation pressure. For each tyre load, a number of camber angles (−2°, −1°, 0°, +1°, +2°) has been set. FIG. 8 shows such a plot, carrying curves of central patch length $PL_c$ measured by the central accelerometer (ordinate) versus cornering angle (abscissa) for different tyre loads at a constant speed of 40 Km/h, with the same tyre load values as above. Curves 81 correspond to a tyre load of 2000 N; curves 82 to a tyre load of 3500 N; curves 83 to a tyre load of 5000 N and curves 84 to a tyre load of 6500 N. For each tyre load, curves corresponding to different camber angles (+2°, +1°, 0°, −1° and −2°) have been indicated by different lines. As it can be seen, surprisingly the curves corresponding different values of camber angles, at the same tyre load, substantially overlap with each other. Furthermore, still surprisingly, the curves show that, at a given tyre load value, $PL_c$ negligibly depends on the cornering angle. In other words, the patch length measured at the tyre centre only varies as a function of the tyre load. In particular, all the curves can be fundamentally considered as horizontal straight lines.

Thus, deriving the cornering angle from a tyre load value and a patch length value measured at the center of the tyre is not practically possible.

In view of the above, the Applicant concentrated its attention on off-center contact patch length measurements, e.g. obtained by off-center, namely internal/external, sensor devices only. In order to know how the off-center contact patch length, the tyre load and the cornering angle are related with each other, the Applicant has performed a characterization of the tyre under test. According to a preferred embodiment of the present invention, the curves of FIGS. 6 and 7 (namely, the patch length value that is measured at an external or internal positions, versus the cornering angle) can be represented by a proper fit function, preferably a linear equation (1) that is the equation of a straight line in a plane:

$$PL_{i/e} = K_\alpha(F_z) \cdot \alpha + Q(F_z, \gamma) \qquad (1)$$

wherein:

$PL_{i/e}$: patch length measured at an internal or external position;

$F_z$: tyre load exerted on the tyre;

$\alpha$: cornering angle;

$\gamma$: camber angle;

$K_\alpha(F_z)$: slope (only dependent on the tyre load); and $Q(F_z, \gamma)$: intercept (dependent both on the tyre load and camber angle).

The characterization step may comprise the step of associating values of $K_\alpha(F_z)$ and $Q(F_z, \gamma)$ for predetermined values of tyre load $F_z$ and camber angle $\gamma$ for the tyre under test.

Knowing $K_\alpha(F_z)$ and $Q(F_z, \gamma)$, from a knowledge of i) the patch length measured in an external (and/or internal) position, ii) the tyre load, and iii) the camber angle, the cornering angle can be inferred from the curves of FIGS. 6 and 7 and/or through equation (1) as follows:

$$\alpha = [PL_{i/e} - Q(F_z, \gamma)] / K_\alpha(F_z) \qquad (2)$$

In a first characterization step, the Applicant has derived a number of curves of slope $K_\alpha(F_z)$ versus $F_z$ from the curves of FIGS. 6 and 7. Two exemplifying curves of $K\alpha$ versus $F_z$ are plotted in FIGS. 9a and 9b, for the internal and external sensor devices, respectively. For each load and each camber angle, the straight lines fitting the experimental data shown in FIGS. 6 and 7 has been calculated. As the slope of the fitting straight lines substantially only depends on the vertical tyre load, for each load value an average slope value of has been calculated in order to find $K_\alpha$ (the average being per formed among the values obtained at different camber angles). Finally, the points representing the values of $K_\alpha$ versus $F_z$ have been plotted and the function best fitting those points has been searched.

Figure 9A:
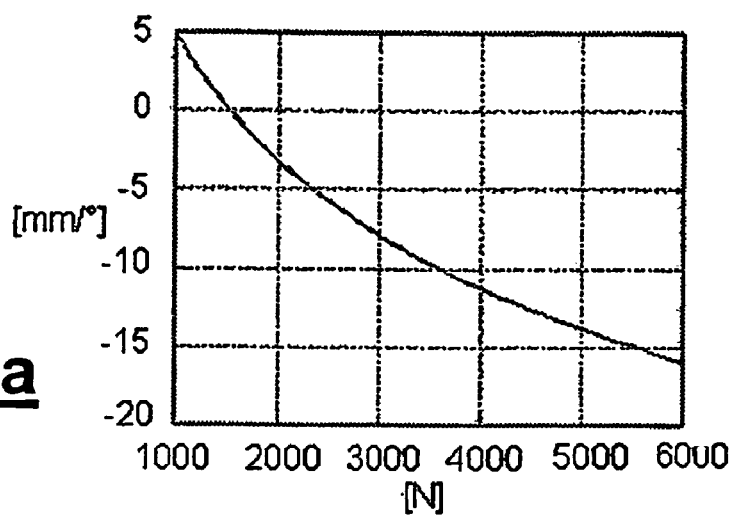
FIGS. 9a and 9b show exemplifying curves of slopes of straight lines fitting the curves of FIGS. 6 and 7, versus tyre load.
Figure 9B:
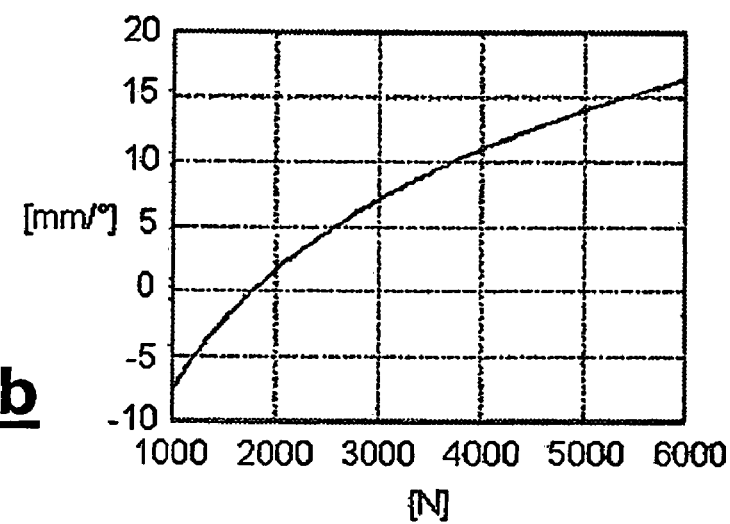

In the graphs of FIGS. 9a and 9b, the tyre load [N] is indicated in abscissa whilst $K_\alpha(F_z)$ [in mm/°] is indicated in ordinate.

According to the Applicant, the function best fitting the curve of points representing the mean values of $K_\alpha$ is the following logarithmic function (3):

$$K_\alpha(F_z) = A_{K\alpha} \cdot \ln(F_z) + B_{K\alpha} \qquad (3)$$

wherein $A_{K\alpha}$ and $B_{K\alpha}$ are proper fit coefficients, substantially related only to the tyre structure.

In a second characterization step, the Applicant has also derived a number of curves of the intercept $Q(F_z, \gamma)$ from the curves of FIGS. 6 and 7, in order to derive how the intercept Q depends on the tyre load and on the camber. For each load and each camber angle, the straight lines fitting the experimental data shown in FIGS. 6 and 7 has been calculated. For each value of load $F_z$, the intercept has been derived from the fitting straight lines. The points indicating Q as a function of camber angle have been plotted, and the Applicant has realized that $Q(\gamma)$ can be fitted by a straight line in a plane. The same has been made for the different tyre loads, and corresponding straight lines have been obtained as shown in FIGS. 10a, 10b (FIG. 10a being for the internal sensor device, FIG. 10b being for the external sensor device)

Figure 10A:
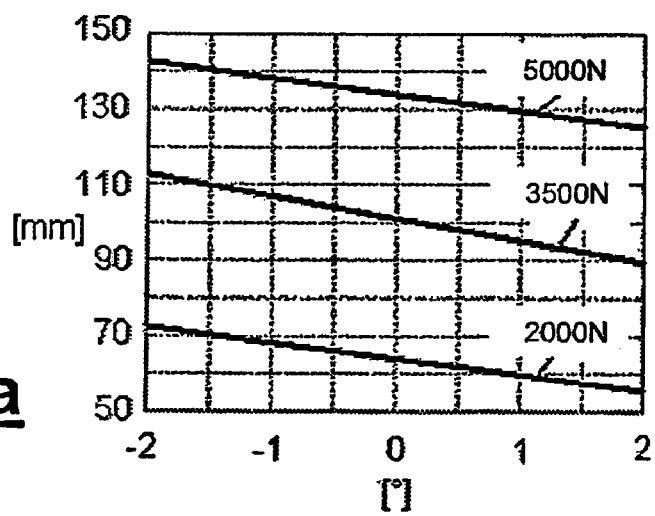
FIGS. 10a and 10b show exemplifying curves of intercepts of straight lines fitting the curves of FIGS. 6 and 7, versus camber angle.
Figure 10B:
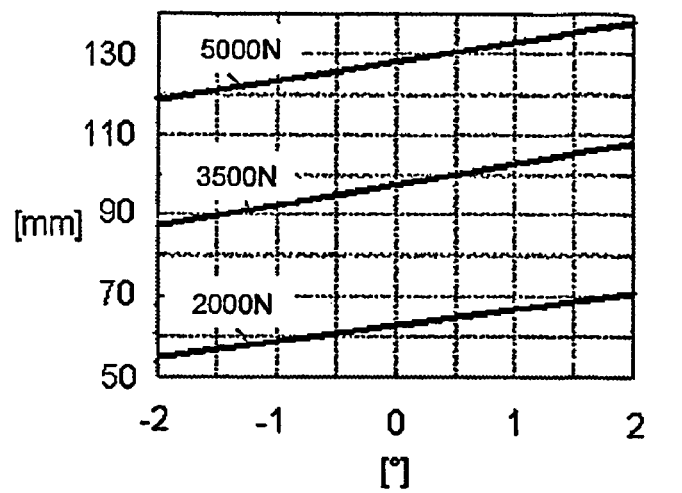

In the graphs of FIGS. 10a and 10b, the camber [in °] is indicated in abscissa whilst Q [in mm] is in ordinate. The three curves of FIG. 10a relate to tyre loads of 2000 N, 3500 N and 5000 N, respectively. Similarly, the three curves of FIG. 10b relate to tyre loads of 2000 N, 3500 N and 5000 N, respectively.

As it can be seen, the curves shown in FIGS. 10a and 10b depend substantially on the tyre load only. In particular, all the curves can be substantially considered as straight lines, wherein the intercept strongly depends on the tyre load, while, on the other hand, the slope slightly depends on it.

Thus, according to a preferred embodiment of the present invention, $Q(F_z, \gamma)$ can be described by the following function (4) of a straight line in a plane:

$$Q(F_z, \gamma) = K_\gamma(F_z) \cdot \gamma + q_\gamma(F_z) \qquad (4)$$

Wherein:

$\gamma$: camber angle;

$K_\gamma(F_z)$: slope (slightly dependent on the tyre load); and $q_\gamma(F_z)$: intercept (slightly dependent on the tyre load).

Figure 11A:
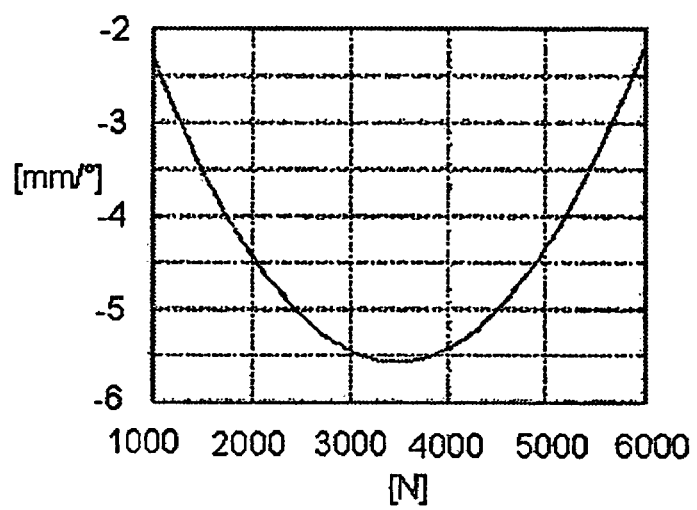
FIGS. 11a and 11b show exemplifying curves of slopes of straight lines fitting the curves of FIGS. 10a and 10b, versus tyre load.
Figure 11B:
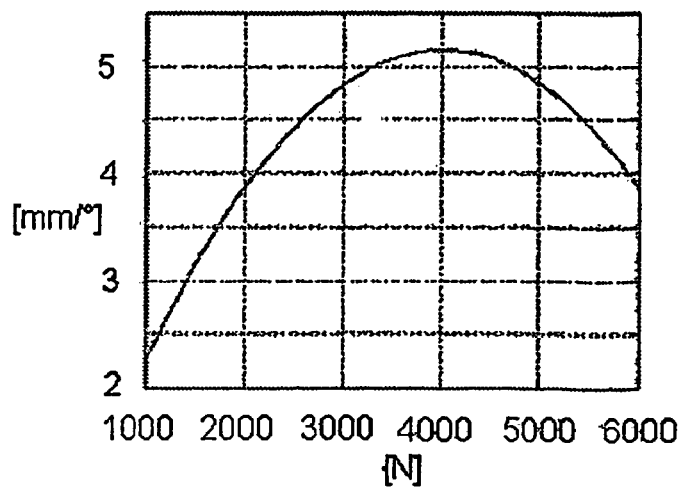

In a third characterization step, the Applicant has derived, from the curves of FIGS. 10a and 10b, how the slope $K_\gamma(F_z)$ depends on the tyre load $F_z$. For the relevant values of $F_z$ the slopes of the curves of FIGS. 10a, 10b were calculated and plotted. The resulting curves of $K_\gamma(F_z)$ versus $F_z$ are shown in FIGS. 11a, 11b (FIG. 11a being for the internal sensor device whilst FIG. 11b being for the external sensor device). In the graphs of FIGS. 11a and 11b, the tyre load is in abscissa [in N] and the coefficient $K_\gamma$ is in ordinate [in mm/°].

According to a preferred embodiment of the present invention, $K_\gamma(Fz)$ can be described by a proper fit function, preferably by the following parabolic function (6):

$$K_\gamma(F_z) = A_{K\gamma} \cdot F_z^2 + B_{K\gamma} \cdot F_z + C_{K\gamma} \qquad (5)$$

wherein $A_{K\gamma}$, $B_{K\gamma}$ and $C_{K\gamma}$ are proper coefficients, substantially related only to the tyre structure.

Figure 12A:
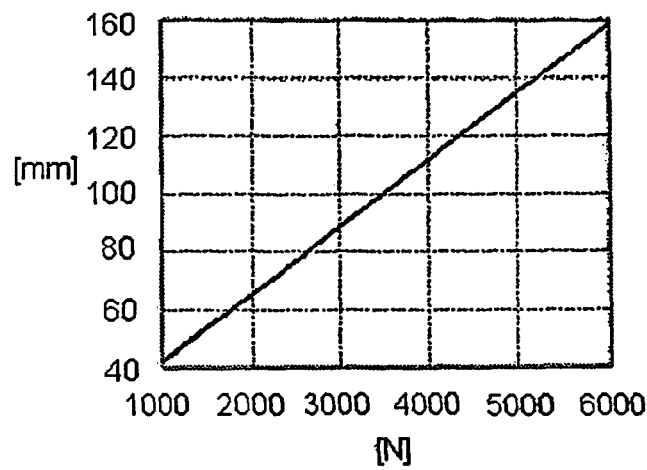
FIGS. 12a and 12b show exemplifying curves of intercepts of straight lines fitting the curves of FIGS. 10a and 10b, versus tyre load.
Figure 12B:
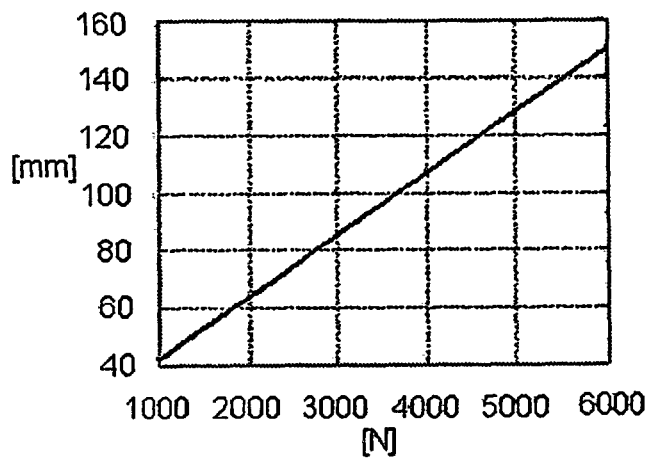

In a fourth characterization step, the Applicant has derived, from the curves of FIGS. 10a and 10b how the intercept $q_\gamma(F_z)$ depends on the tyre load $F_z$. For the relevant values of $F_z$ the intercepts of the curves of FIGS. 10a, 10b were calculated and plotted. The resulting curves of $q_\gamma(F_z)$ versus $F_z$ are shown in FIGS. 12a, 12b (FIG. 12a being for the internal sensor device whilst FIG. 12b being for the external sensor device). In the graphs of FIGS. 12a and 12b, the tyre load is in abscissa [in N] and the coefficient $q_\gamma$ is in ordinate [in mm].

According to a preferred embodiment of the present invention, $q_\gamma(F_z)$ can be described by a proper fit function, preferably by the following function (7) of a straight line in a plane:

$$q_\gamma(F_z) = A_{q\gamma} \cdot F_z + B_{q\gamma} \qquad (6)$$

wherein $A_{q\gamma}$, $B_{q\gamma}$ are proper coefficients, substantially related only to the tyre structure.

In view of all the above characterization steps, the Applicant has found the following preferred formula (7) linking the off-center contact patch length with the tyre load, the camber angle γ and the cornering angle α.

$$PL_{i/e} = (A_{K\alpha} \cdot \ln(F_z) + B_{K\alpha}) \cdot \alpha + [(A_{K\gamma} \cdot F_z^2 + B_{K\gamma} \cdot F_z + C_{K\gamma}) \cdot \gamma + (A_{q\gamma} \cdot F_z + B_{q\gamma})] \quad (7)$$

Thus, by real-time measuring $PL_{i/e}$, as well as by knowing the camber angle and the tyre load, the cornering angle can be calculated by formula (8):

$$\alpha = \{PL_{i/e} - [(A_{K\gamma} \cdot F_z^2 + B_{K\gamma} \cdot F_z + C_{K\gamma}) \cdot \gamma + (A_{q\gamma} \cdot F_z + B_{q\gamma})]\} / (A_{K\alpha} \cdot \ln(F_z) + B_{K\alpha}) \quad (8)$$

The various fit coefficients of formula (8), can be stored within the memory included within the fixed unit or within the sensor devices 3 located in the tread area of the tyre. The above described characterization of the tyre can be performed once per tyre model, for example in indoor tests.

The above described formulas for calculation of the actual cornering angle can also be stored within the memory of the fixed unit or of the sensor device, in order to be used by the associated processing unit.

It should be clear that the above method for deriving the cornering angle of the tyre can be implemented not only by using the described methods and arrangement of sensor devices 3c, 3i, 3e, but with any other method or arrangement useful for calculating the patch length $PL_{i/e}$.

As far as the determination of the tyre load is concerned, it has been already said (see FIG. 8) that the patch length measured at the tyre centre only varies as a function of the tyre load and is not affected by the maneuver being performed by the vehicle (i.e. the cornering conditions) or by the camber conditions. In particular, all the curves of FIG. 8 can be fundamentally considered as horizontal straight lines. In other words, the tyre load can be derived by a simple measurement of contact patch length performed substantially in correspondence of the equatorial plane of the tyre.

Figure 13:
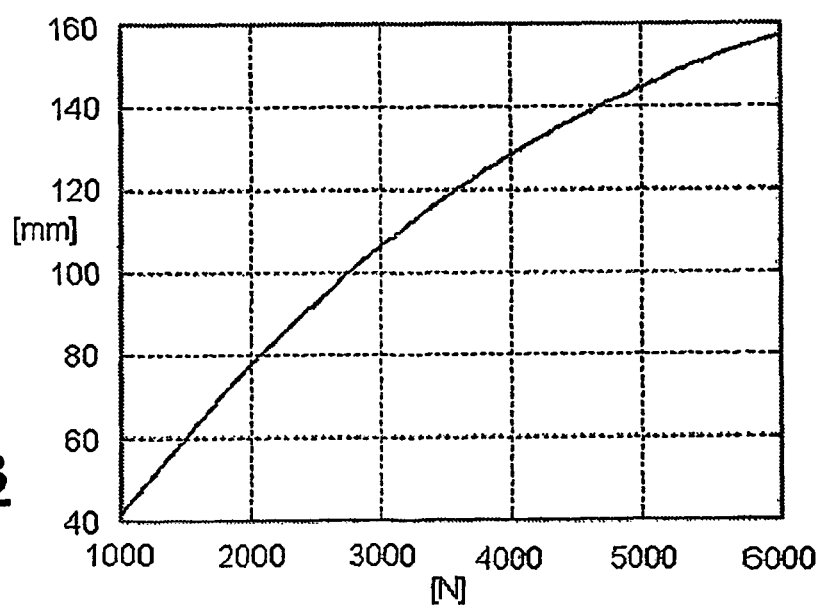
FIG. 13 shows a plot carrying a curve of patch length measured by the central sensor device versus tyre load.

In view of the above, the Applicant concentrated its attention on measurements obtained by the central sensor device only for calculating the vertical tyre load. In order to know how the patch length and the tyre load are connected, the Applicant has performed a further characterization step. More particularly, from the curves of FIG. 8, the average values of $PL_c$ were found for each value of tyre load $F_z$ considered. The result is plotted in FIG. 13, which shows a curve fitting the experimental points.

The Applicant has found that a proper fit function may be the following:

$$Fz = B_{PLc} \tan(PL_c / A_{PLc}) \quad (9)$$

wherein:
$PL_c$: length of the contact region between tyre and rolling surface measured at the tyre equatorial plane; and
$A_{PLc}$, $B_{PLc}$: fit coefficients The fit coefficients $A_{PLc}$ and $B_{PLc}$ are substantially related only to the tyre structure.

Such fit coefficients can be stored within the memory included within the fixed device or within the sensor device 3c located in the tread area of the tyre. However, it has to be noticed that the invention herein described is not limited to this method for calculating the tyre load.

As far as the determination of the camber angle is concerned, it can be calculated through a measurement made on the suspension, e.g. using a triangulation method.

The Applicant believes that the fit coefficients at formulas (1) to (9) do not vary considerably according to the tyre pressure, at least in a range around the nominal value, defined by the vehicle and tyre manufacturers. In any case, for a more complete and exhaustive tyre characterization, the same tests described herein for a pressure equal, or very close, to the nominal one could be performed at different pressure values in order to find a corresponding set of fit coefficients related to such pressure values.

A real-time determined cornering angle of a tyre mounted on a vehicle is an important parameter that can be passed to a vehicle control system, in order to control the behavior of the vehicle, particularly in critical conditions. A vehicle control system may comprise a brake controller (for example, an anti-lock brake unit), and/or a steering controller, and/or a suspension controller and/or a vehicle stability control system.

For example, a vehicle brake control system may adjust the braking force on each tyre according to the real-time determined cornering angle.

As another example, the vehicle stability envelope may be detected by the vehicle control system in order to select the maximum perturbation allowed from steering commands. This information may be compared with the real-time determined cornering angle in order to understand if a dangerous yaw rate could be reached. Possibly, a correction command could be also imparted to a steering control system (Electrically Assisted Steering Systems).

The conditions of the vehicle may indicate that the performance of the vehicle is reduced and that the driver should restrict his driving manoeuvers. The vehicle control system itself can take action, for example in order to limit the maximum vehicle speed to maintain stability and not exceed the tyre specifications, or to limit steering yaw rate in order to keep rollovers from occurring. The driver may be alerted to the current vehicle control system condition and of the actions that the vehicle control system has taken on his behalf to safe the vehicle (reducing the maximum attainable speed, steering rate, engine power), as needed on a display device. On the same display device it may also be shown whether he should take further action on his own (change the distribution of mass, restrict driving maneuvers and speed). The display device may comprise a visual and/or an audible unit, for example located in the dashboard of the vehicle.

There have thus been shown and described a novel system and a novel method which fulfill all the objects and advantages sought therefore. Many changes, modifications, variations and other uses and applications of the subject invention will, however, become apparent to those skilled in the art after considering the specification and the accompanying drawings which disclose preferred embodiments thereof.

For example, the actual storing of the fit functions (1) to (9) and/or of the fit coefficients within the memory associated to the sensor device and/or to the fixed unit may be substituted by the storing of a database collecting the cornering angle value versus predetermined values of tyre load and camber angle (and, possibly, of pressure).

All such changes, modifications, variations and other uses and applications which do not depart from the scope of the invention are deemed to be covered by the invention which is limited only by the claims which follow.

The invention claimed is:

1. A method for determining a cornering angle of a tyre fitted on a vehicle during running of said vehicle on a rolling surface, the tyre comprising an equatorial plane, comprising the steps of:
   estimating a length of a contact region between said tyre and said rolling surface, said length being measured at a distance from the equatorial plane;

estimating a load exerted on said tyre;
estimating a camber angle to which said tyre is subjected; and
deriving the cornering angle from said camber angle, tyre load and contact region length.

2. The method according to claim 1, wherein said step of measuring a length of a contact region comprises the step of acquiring a first acceleration signal.

3. The method according to claim 2, further comprising a step of low-pass filtering said first signal.

4. The method according to claim 2, wherein said step of acquiring a first acceleration signal comprises acquiring a tangential acceleration signal.

5. The method according to claim 4, wherein the step of acquiring a first acceleration signal comprises measuring a distance between a maximum value and a minimum value of said first signal.

6. The method according to claim 2, wherein said step of acquiring a first acceleration signal comprises acquiring a radial acceleration signal.

7. The method according to claim 6, wherein the step of acquiring a first acceleration signal comprises measuring a distance between two maxima of said first signal.

8. The method according to claim 1, wherein the step of deriving the cornering angle from the camber angle, the tyre load and the contact region length comprises the step of providing characteristic curves of the contact region versus the cornering angle for at least one tyre load.

9. The method according to claim 8, further comprising providing a fit equation approximating the characteristic curves of the contact region versus the cornering angle.

10. The method according to claim 9, wherein the step of providing a fit equation approximating the characteristic curves of the contact region versus the cornering angle comprises the step of providing the equation of a straight line in a plane, and further comprises associating values of slope and intercept for predetermined conditions of tyre load and camber angle for said tyre.

11. A system for determining a cornering angle of a tyre fitted on a vehicle during running of said vehicle on a rolling surface, the tyre comprising an equatorial plane, comprising:
a device for measuring a length of a contact region between said tyre and said rolling surface, said length being measured at a distance from the equatorial plane;
a device for estimating a tyre load exerted on said tyre;
a device for estimating a camber angle to which said tyre is subjected; and
at least one processing unit adapted to derive the cornering angle from said camber angle, tyre load and contact region length.

12. The system according to claim 11, wherein said measuring device comprises at least one radial accelerometer producing at least one radial acceleration signal.

13. The system according to claim 11, wherein said measuring device comprises at least one tangential accelerometer producing at least one tangential acceleration signal.

14. The system according to claim 11, wherein said device for estimating a tyre load exerted on said tyre comprises at least one radial accelerometer producing at least one radial acceleration signal.

15. The system according to claim 11, wherein said device for estimating a tyre load exerted on said tyre comprises at least one tangential accelerometer producing at least one tangential acceleration signal.

16. The system according to claim 11, wherein said measuring device and said device for estimating a tyre load exerted on said tyre comprises a sampling device adapted to sample said signal at a frequency of at least 5 kHz.

17. The system according to claim 16, wherein said sampling device is adapted to sample said signal at a frequency of at least 7 kHz.

18. The system according to claim 11, further comprising at least one memory associated with said processing unit.

19. The system according to claim 18, wherein said at least one memory comprises pre-stored characteristic functions describing an expected contact region length versus cornering angle corresponding to predetermined conditions of tyre load and camber.

20. The system according to claim 11, wherein said measuring device is included in a sensor device located in a tread area portion of said tyre.

21. The system according to claim 20, wherein said sensor device is disposed at a distance of 15% to 30% of the tread width from the equatorial plane of the tyre.

22. The system according to claim 20, wherein said sensor device is disposed at a distance of 18% to 28% of the tread width from the equatorial plane of the tyre.

23. The system according to claim 20, wherein said sensor device is disposed at a distance of 20% to 25% of the tread width from the equatorial plane of the tyre.

24. The system according to claim 20, wherein said sensor device is secured to an inner liner of the tyre.

25. The system according to claim 24, comprising a damping element between said sensor and said inner liner.

26. The system according to claim 20, wherein said sensor device further comprises a transmitting device.

27. The system according to claim 26, wherein said transmitting device is operatively connected to a first antenna.

28. The system according to claim 11, further comprising a filtering device adapted for low-pass filtering said acceleration signal.

29. The system according to claim 20, wherein said sensor further comprises a power source.

30. The system according to claim 29, wherein said power source comprises a battery.

31. The system according to claim 29, wherein said power source comprises a self-powering device adapted to generate electrical power as a result of mechanical stresses undergone by said sensor device during running of said vehicle.

32. The system according to claim 31, wherein said self-powering device comprises a piezoelectric element.

33. The system according to claim 31, wherein said self-powering device comprises an electrical storage circuit.

34. The system according to claim 33, wherein said electrical storage circuit comprises a resistor and a capacitor.

35. The system according to claim 20, wherein said processing unit is included within said sensor device.

36. The system according to claim 20, further comprising a fixed unit located on the vehicle, comprising a receiving device for receiving data from said sensor device.

37. The system according to claim 36, wherein said receiving device comprises a second antenna.

38. The system according to claim 27, wherein said first antenna and a second antenna are adapted for data transmission at a frequency of 400 to 450 MHz.

39. A method of controlling a vehicle having at least one tyre fitted thereon, comprising:
determining a cornering angle of said tyre by the method according to claim 1;
passing said determined cornering angle to a vehicle control system of the vehicle; and adjusting at least one parameter in said vehicle control system based on said determined cornering angle.

40. The method according to claim 39, wherein said vehicle control system comprises a brake control system, and said step of adjusting at least one parameter comprises adjusting a braking force on said tyre.

41. The method according to claim 39, wherein said vehicle control system comprises a steering control system, and said step of adjusting at least one parameter comprises selecting a maximum variation allowed from steering commands.

42. The method according to claim 39, wherein the vehicle control system comprises a suspension control system, and said step of adjusting at least one parameter comprises adjusting stiffness of a suspension spring associated with said tyre.

* * * * *